(12) United States Patent
Bauer et al.

(10) Patent No.: US 12,261,539 B2
(45) Date of Patent: Mar. 25, 2025

(54) SELF-OSCILLATING RESONANT PUSH-PULL CONVERTER WITH A SYNCHRONOUS RECTIFIER FOR PHASE-MODULATED BIDIRECTIONAL COMMUNICATION

(71) Applicant: Endress+Hauser SE+Co. KG, Maulburg (DE)

(72) Inventors: Max Bauer, Rheinfelden (DE); Peter Wehrli, Aarau (CH); Lukas Gätzi, Zürich (CH)

(73) Assignee: Endress+Hauser SE+Co. KG, Maulburg (DE)

( * ) Notice: Subject to any disclaimer, the term of this patent is extended or adjusted under 35 U.S.C. 154(b) by 262 days.

(21) Appl. No.: 18/004,729

(22) PCT Filed: Jun. 21, 2021

(86) PCT No.: PCT/EP2021/066735
§ 371 (c)(1),
(2) Date: Jan. 9, 2023

(87) PCT Pub. No.: WO2022/008211
PCT Pub. Date: Jan. 13, 2022

(65) Prior Publication Data
US 2023/0253890 A1  Aug. 10, 2023

(30) Foreign Application Priority Data
Jul. 9, 2020 (DE) ..................... 10 2020 118 176.0

(51) Int. Cl.
*H02M 3/335* (2006.01)
*H02M 3/00* (2006.01)

(52) U.S. Cl.
CPC ......... *H02M 3/33592* (2013.01); *H02M 3/01* (2021.05); *H02M 3/33584* (2013.01)

(58) Field of Classification Search
CPC ......... H02M 3/33592; H02M 3/33523; H02M 3/01; H02M 3/33584; H02M 3/3382
See application file for complete search history.

(56) References Cited

U.S. PATENT DOCUMENTS 5,471,378 A * 11/1995 King .................. H02M 3/33546
363/80
2005/0156656 A1 * 7/2005 Rotzoll ................. H02M 7/219
327/423

(Continued)

FOREIGN PATENT DOCUMENTS

EP     1231557 A2    8/2002
EP     2355327 A2    8/2011

(Continued)

OTHER PUBLICATIONS

Li, et al., Syncrhonous Rectification-Based Phase Shift Keying Communication for Wireless Power Transfer Systems, 978-1-5386-8257-9/18, © 2018, IEEE, 4 pp.

*Primary Examiner* — Alex Torres-Rivera
(74) *Attorney, Agent, or Firm* — Mark A. Logan; Endress+Hauser (USA) Holding, Inc.

(57) ABSTRACT

A DC/DC converter circuit for phase-modulated communication comprises a push-pull driver to which a reference clock having a fixed predefined frequency can be applied on the input side; a transformer having a primary and secondary coil, wherein the push-pull driver is connected to the primary coil on the output side; a synchronous rectifier connected to the secondary coil on the AC-side; a resonant circuit having a capacitance and an inductance, wherein the resonant circuit is designed such that a part of the resonant circuit is on a primary side of the transformer and another part of the resonant circuit is on a secondary side of the transformer; a decoupling inductor connected on a secondary side of the transformer and downstream of the synchro- (Continued)

nous rectifier, which is not part of the resonant circuit; and an output capacitor connected in series with the decoupling inductor via which an output voltage is provided.

15 Claims, 8 Drawing Sheets

(56) References Cited

U.S. PATENT DOCUMENTS

| | | |
|---|---|---|
| 2007/0297199 A1* | 12/2007 | Sauerlander ........ H02M 3/3382 363/21.02 |
| 2014/0254203 A1 | 9/2014 | Dai et al. |
| 2015/0222193 A1* | 8/2015 | Zambetti ................ H02M 1/08 363/21.02 |
| 2015/0381064 A1 | 12/2015 | Matsubara et al. |
| 2019/0222126 A1* | 7/2019 | Parisi ................ H02M 3/33523 |
| 2020/0135387 A1* | 4/2020 | Lutze ................ H02M 3/33573 |

FOREIGN PATENT DOCUMENTS

| | | | |
|---|---|---|---|
| EP | 2393194 | A1 | 12/2011 |
| EP | 3151407 | A1 | 4/2017 |
| EP | 3468017 | A1 | 4/2019 |

* cited by examiner

SELF-OSCILLATING RESONANT PUSH-PULL CONVERTER WITH A SYNCHRONOUS RECTIFIER FOR PHASE-MODULATED BIDIRECTIONAL COMMUNICATION

CROSS-REFERENCE TO RELATED APPLICATIONS

The present application is related to and claims the priority benefit of DPMA Patent Application No. 10 2020 118 176.0, filed on Jul. 9, 2020, and International Patent Application No. PCT/EP2021/066735, filed on Jun. 21, 2021, the entire contents of which are incorporated herein by reference.

TECHNICAL FIELD

The invention relates to a DC/DC converter circuit for phase-modulated communication, especially bidirectional communication, to a method for operating such a DC/DC converter circuit, to a communication system for bidirectional galvanically isolated communication, and to a field device having such a communication system.

BACKGROUND

In automation, field devices serving to record and/or modify process variables are frequently used, particularly in process automation. Sensors, such as fill-level measuring devices, flow meters, pressure and temperature measuring devices, pH redox potential meters, conductivity meters etc., are used for recording the respective process variables, such as fill level, flow, pressure, temperature, pH level, and conductivity. Actuators, such as, for example, valves or pumps, are used to influence process variables. The flow rate of a fluid in a pipeline section or a fill level in a container can thus be altered by means of actuators. Field devices, in principle, refer to all devices that are used in-process and that supply or process process-relevant information. In the context of the invention, field devices also include remote I/Os, radio adapters, and/or, in general, devices that are arranged at the field level.

A variety of such field devices is manufactured and marketed by the Endress+Hauser company.

Many field devices are available in so-called 2-wire versions. In this case, power is supplied to the field device by means of the same pair of lines used for communication.

In contrast to 2-wire devices, 4-wire devices require an additional pair of lines for power supply, and of course this increases the wiring expense. For 2-wire devices, the available power is usually subject to certain limitations. The input voltage normally varies between 10 and 36 V. For a 4-20-mA current loop, for example typically at least 4 mA is available at an input voltage of approximately 12 V.

Especially in the process industry, physical or technical variables must often be measured or determined by the field devices in areas in which there is potentially a risk of explosion, so-called explosive atmospheres. By means of suitable measures in the field devices and evaluation systems (for example, voltage and current limiting), the electrical energy which is present in the system for the transferring of the signals can be limited such that an explosion cannot be triggered under any circumstances (short circuit, interruptions, thermal effects, etc.). For this purpose, corresponding protection principles have been defined in IEC EN DIN 60079 ff.

According to this standard, design and circuitry measures for the field devices for use in explosive atmospheres are defined on the basis of the ignition protection types to be applied. Two of these ignition protection types are the ignition protection type "flameproof enclosures" (identifier Ex-d, IEC EN DIN 60079-1) and the ignition protection type "intrinsic safety" (identifier Ex-i or Ex-ia, IEC EN DIN 60079-11).

The ignition protection type "intrinsic safety" (Ex-i or Ex-ia) is based on the principle of current and voltage limiting in a circuit. The energy of the circuit, which could be capable of bringing an explosive atmosphere to ignition, is limited in such a way that the surrounding explosive atmosphere can be ignited neither by sparks nor by impermissible heating of the electrical components.

For this reason, the field device usually consists of main electronics, to which the 2 wires or possibly the 4 wires are connected, and sensor electronics, which are galvanically isolated from the main electronics and which determine, by means of a sensor element, the physical variable to be measured. For power transmission and data transfer, a plurality of galvanically isolated interfaces is usually provided between the main electronics and the sensor electronics.

In order to enable data communication between the main electronics and the sensor electronics, such field devices have galvanically isolated data interfaces, which can be designed e.g. as inductive, capacitive or optical data interfaces.

In general, measurement data which represent the measured physical variable are transferred from the sensor electronics to the main electronics, and primarily parameters are transferred from the main electronics to the sensor electronics, via the galvanically isolated interfaces.

Furthermore, an additional galvanically isolated DC/DC converter circuit is provided for supplying power to the sensor electronics. By means of the DC/DC converter circuit, power is transmitted from the main electronics to the sensor electronics via an additional channel.

In the case of such DC/DC converters, which are provided for potential isolation in field devices with very low power, essentially two specifications are decisive for the feasibility. The first specification is the size of a possible structure of such a DC/DC converter circuit and the lowest possible complexity. The second specification is the efficiency and the switching performance in relation to the implementation expenditure.

Figure 1:
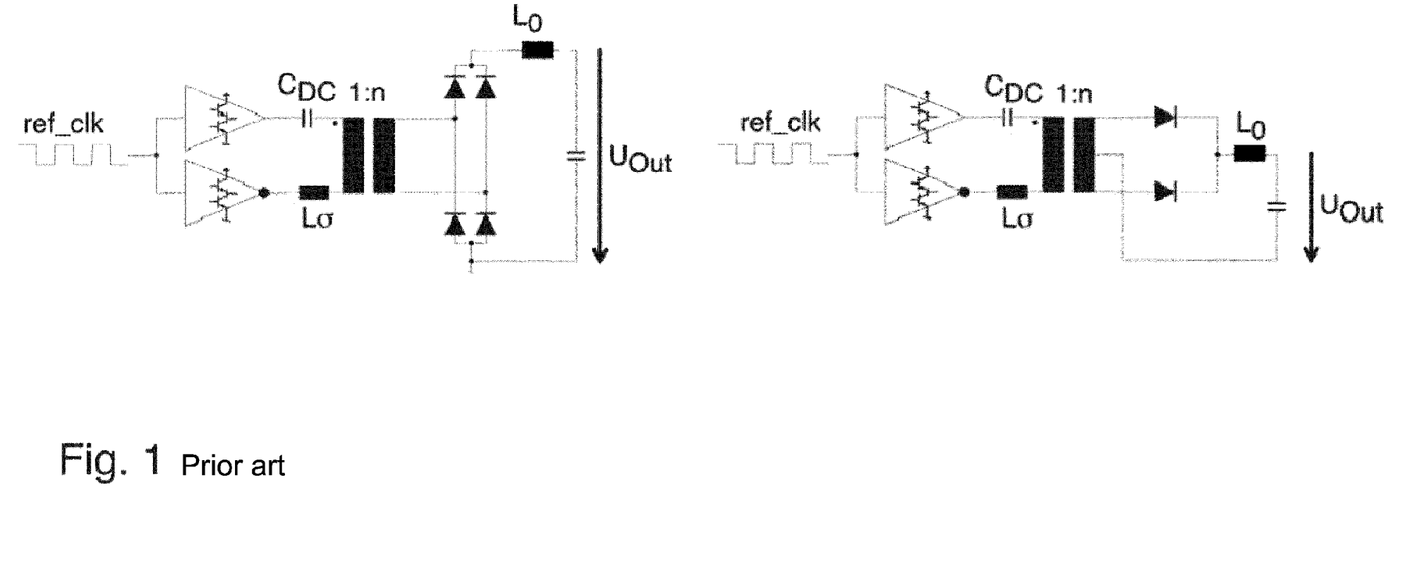
FIG. 1 shows two DC/DC converter circuits known from the prior art.

As a result of these specifications, the two circuit arrangements of the prior art which are shown in FIG. 1 have become established. This is also especially due to the low complexity of the circuit arrangements. Both circuit arrangements comprise a pull-push driver, a transformer connected thereto, a diode rectifier, optionally a filter element in the form of a storage choke, and an output capacitor. In the case of low power (<5 W), it is not unusual to omit a possible storage choke for decoupling the output capacitor.

However, the two DC/DC converter circuits shown in FIG. 1 have considerable disadvantages with respect to efficiency and load behavior, especially in the case of low power:

Due to the leakage inductance of the transformer (represented by the inductance $L\sigma$ in FIG. 1), and due to the diode flux voltages in the rectifier, the output voltage is highly load-dependent. This is possible up to a factor of two between idle (peak value rectification) and full load.

At higher switching frequencies, starting from approximately 100 kHz, the efficiency of the circuit decreases due to the commutation losses in the rectifier, since all diodes are briefly conductive. This effect is additionally exacerbated when the diodes are replaced by active switching elements (synchronous rectifier).

The higher the switching frequency should/must be, the more the performance of the circuit deteriorates (commutation losses, influence of leakage inductance, idling/full-load behavior). Switching frequencies up to approximately 1 MHz can be necessary if, for example, the switching frequency is to be used simultaneously as a reference channel for digital signal transfer. In this case, the performance of a conventional circuit must be greatly improved in order to ensure feasibility.

The invention therefore addresses the problem of proposing a DC/DC converter circuit which has the same or only slightly greater complexity in comparison with the DC/DC converter circuits known from the prior art and at the same time has higher efficiency and improved load behavior and in the case of which additionally the switching frequency can be increased.

SUMMARY

The DC/DC converter circuit according to the invention for phase-modulated communication, especially bidirectional communication, comprises:
- a push-pull driver to which a reference clock with a fixed frequency can be applied on the input side;
- a transformer having a primary and a secondary coil, wherein the push-pull driver is connected, on the output side, to the primary coil;
- a synchronous rectifier which is connected, on the AC side, preferably only to the secondary coil;
- a resonant circuit comprising at least one capacitance and one inductance, wherein the resonant circuit is designed such that at least one part of the resonant circuit is formed on a primary side of the transformer and another part of the resonant circuit is formed on a secondary side of the transformer;
- a decoupling inductance which is connected on a secondary side of the transformer and downstream of the synchronous rectifier and which is not part of the resonant circuit; and
- an output capacitance which is connected in series with the decoupling inductance and via which an output voltage is provided.

According to the invention, a DC/DC converter circuit is proposed which enables switching frequencies into the MHz range, so that the circuit can be combined for phase-modulated communication in addition to simply providing an output voltage for power supply on the secondary side of the transformer. Furthermore, the DC/DC converter circuit according to the invention has smaller fluctuations in output voltage between idling and full load and significantly better efficiency despite increased switching frequencies, in comparison with the circuits known from the prior art.

An advantageous embodiment of the DC/DC converter circuit according to the invention provides that the part of the resonant circuit formed on the secondary side of the transformer is connected to the synchronous rectifier on the DC side. In particular, the embodiment can provide that the synchronous rectifier comprises four controlled field-effect transistors and that the field-effect transistors are directly connected to the secondary coil of the transformer via control lines, so that a transformer output voltage actuates the field-effect transistors, and/or that the synchronous rectifier is formed, in a positive half, from P-channel MOSFETs and, in a negative half, from N-channel MOSFETs.

An alternative embodiment of the DC/DC converter circuit according to the invention provides that the part of the resonant circuit formed on the secondary side of the transformer is connected to the synchronous rectifier on the AC side. In particular, the embodiment can provide that the synchronous rectifier comprises two controlled field-effect transistors and that the field-effect transistors are directly connected to the secondary coil of the transformer via control lines, so that a transformer output voltage actuates the field-effect transistors, and/or that the output voltage is tapped between the decoupling inductance and a center tap of the secondary coil of the transformer.

Another advantageous embodiment of the DC/DC converter circuit according to the invention provides that the DC/DC converter circuit according to one or more of the preceding claims, wherein the field-effect transistors are connected to the secondary coil of the transformer in such a way that a drain terminal of each field-effect transistor is connected to a coil start and a gate terminal of each field-effect transistor is connected to a coil end of the secondary coil or that a drain terminal of each field-effect transistor is connected to a coil end and a gate terminal of each field-effect transistor is connected to a coil start of the secondary coil.

Another advantageous embodiment of the DC/DC converter circuit according to the invention provides that a turns ratio of the transformer of the DC/DC converter circuit is selected such that the secondary-side transformer output voltage is less than 20 V.

Another advantageous embodiment of the DC/DC converter circuit according to the invention provides that an input capacitance for DC suppression is present on the primary side of the transformer, wherein the DC/DC converter circuit is designed such that the input capacitance is not part of the resonant circuit.

The invention also relates to a method for operating a DC/DC converter circuit according to one of the previously described embodiments, wherein, for operation of the DC/DC converter circuit, a reference clock, which has a fixed frequency that is not changed during operation, is applied to the push-pull driver on the input side.

An advantageous embodiment of the method according to the invention provides that the frequency is greater than 100 kHz, particularly preferably is approximately 450 kHz.

The invention also relates to a communication system for bidirectional galvanically isolated communication, comprising:
- a DC/DC converter circuit according to a previously described embodiment, which has a first galvanic isolation by virtue of the transformer and provides the output voltage for power supply on the secondary side of the transformer;
- a transmitting transfer channel, which has a modulator unit connected, for data transfer, to a demodulation unit via a second galvanic isolation;
- a receiving transfer channel, which has a demodulator unit connected to a modulator unit via a third galvanic isolation;
- wherein, for the modulation units and demodulation units, the DC/DC converter circuit also provides, on the primary side and the secondary side, a reference clock required for modulation and demodulation.

An advantageous embodiment of the communication system according to the invention provides that the reference clock is implemented on the primary side by a tap at the output of the push-pull driver of the DC/DC converter circuit and that the reference clock is implemented on the secondary side by a tap at the output of the transformer of the DC/DC converter circuit.

Another advantageous embodiment of the communication system according to the invention provides that a phase shift unit for shifting the phase of the reference clock by 90° is inserted on the secondary side.

The invention also relates to an automation field device for use in an explosive atmosphere, especially in an Ex-ia and/or Ex-d area, comprising main electronics and sensor electronics, which are galvanically isolated from the main electronics, wherein the main electronics are connected, for data transfer, to the sensor electronics via a communication system according to a previously described embodiment.

BRIEF DESCRIPTION OF THE DRAWINGS

The invention is explained in more detail on the basis of the following drawings. The following is shown.

DETAILED DESCRIPTION

FIG. 1 shows two DC/DC converter circuits known from the prior art, which have already been discussed at the beginning.

Figure 2:
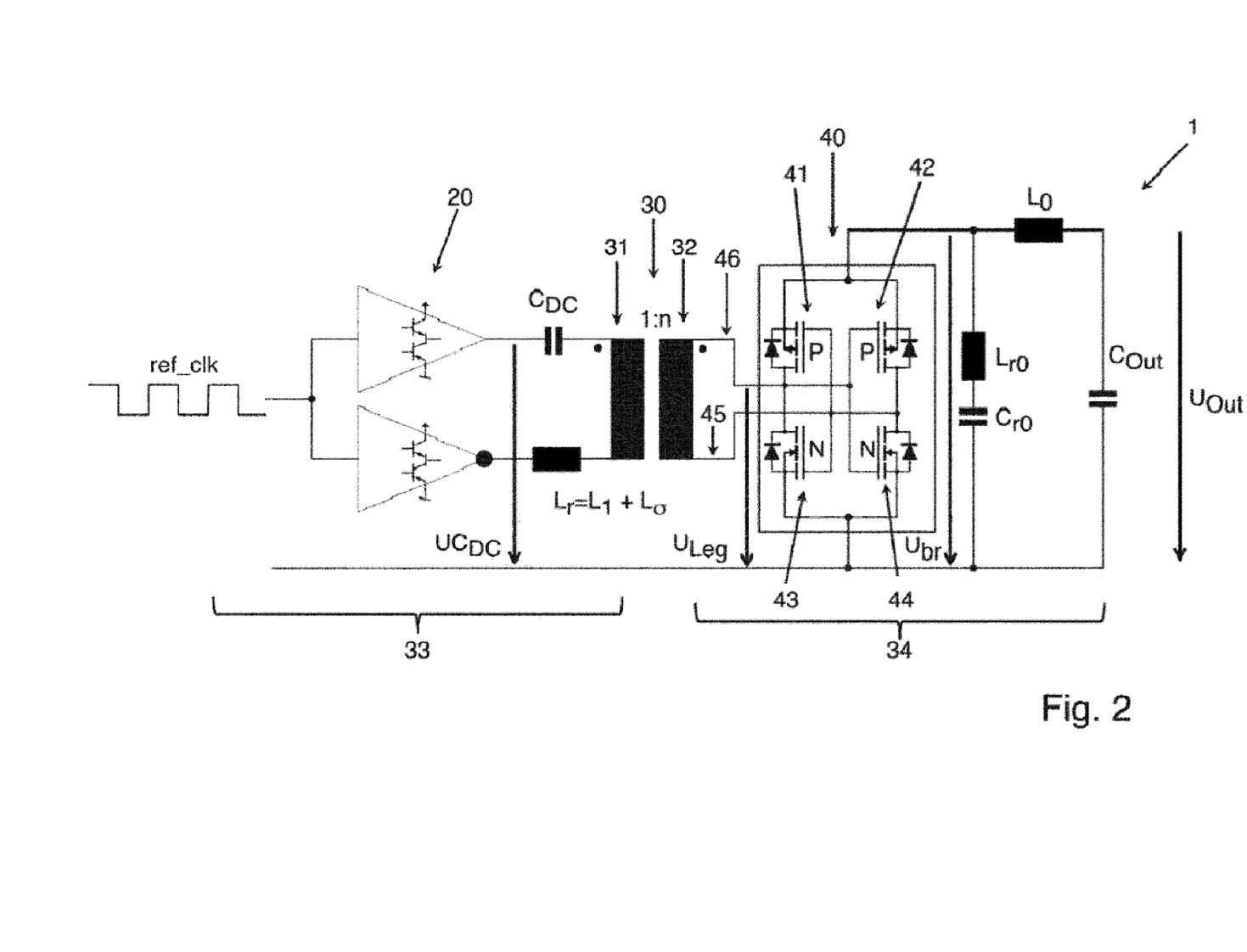
FIG. 2 shows a first embodiment of a DC/DC converter circuit according to the present disclosure.

FIG. 2 shows a first embodiment of a circuit arrangement according to the invention. The circuit arrangement comprises, on the input side, a push-pull driver with an inverting driver (marked in FIG. 2 by a dot at the output) and with a noninverting driver, which are connected in parallel with one another and at the input of which a reference clock ref_clk is or can be applied.

Furthermore, the circuit arrangement comprises a transformer, the primary coil of which is connected to the respective outputs of the driver stages. Optionally, the circuit arrangement can also comprise a capacitor for DC suppression $C_{DC}$, which is connected between the primary coil and an output of the noninverting operational amplifier. A leakage inductance caused by the operation of the transformer is likewise taken into account on the primary side of the transformer by means of Lσ and shown in FIG. 2.

A synchronous rectifier is connected to the secondary side of the transformer. As shown in FIG. 2, the synchronous rectifier can be formed by means of four MOSFETs. In the positive half they are P-channel MOSFETs, and in the negative half they are N-channel MOSFETs. For actuation, the gate terminals of the MOSFETs are connected directly to the secondary side of the transformer, so that the transformer output voltage actuates the MOSFETs. The MOSFETs are actuated preferably via crossed control lines. This means that the MOSFETS 41-44 are connected to the secondary coil 32 of the transformer 30 such that a drain terminal of each MOSFET 41-44 is connected to a coil start and a gate terminal of each MOSFET 41-44 is connected to a coil end of the secondary coil 32 or a drain terminal of each MOSFET 41-44 is connected to a coil end and a gate terminal of each MOSFET 41-44 is connected to a coil start of the secondary coil 32.

On the DC side of the synchronous rectifier, an output capacitor $C_{Out}$ is connected in parallel with the output of the synchronous rectifier. The output capacitor $C_{Out}$ is decoupled from the synchronous rectifier by means of an inductance $L_0$, which has a value greater than 200 microhenrys (μH).

Figure 4:
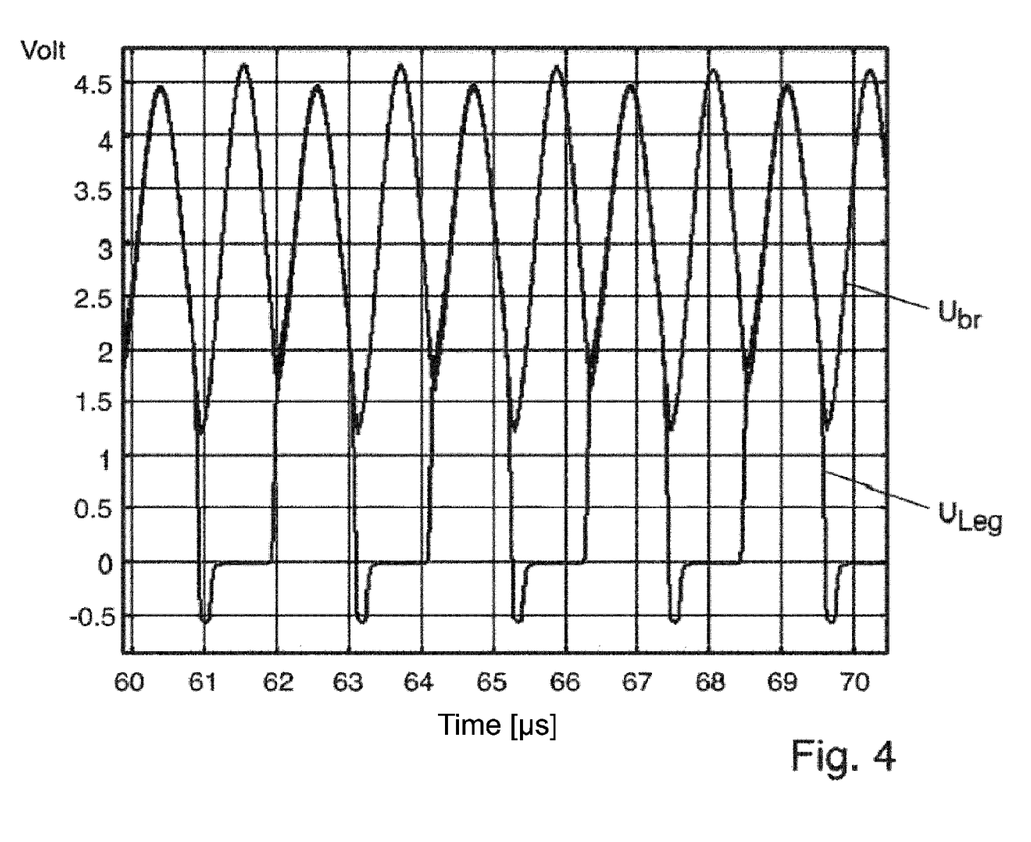
FIG. 4 shows typical voltage forms or voltage curves of the voltages at the synchronous rectifier.

Functionally, the inductance $L_0$ and the output capacitor $C_{Out}$ form a filter at the output of the synchronous rectifier. This decoupling is necessary since the voltage at the rectifier output $U_{br}$ pulses as a result of the resonant circuit. FIG. 4 shows, as an example of this, typical voltage forms or voltage curves of the voltages at the synchronous rectifier input $U_{Leg}$ and at the synchronous rectifier output $U_{br}$. The pulsing of the output voltage $U_{br}$ can be clearly seen in the upper half of the graph.

Furthermore, on the primary side an additional inductance L1 is arranged, which is connected in series with the transformer and forms, together with the leakage inductance Lσ, a resonant inductance $L_r$. The resonant inductance $L_r$ forms, together with a resonant capacitance $C_{r0}$ which is arranged on the secondary side and which acts parallel to a load, a resonant circuit. The resonant capacitance Cr0 also has an inductance Lr0, which acts parasitically in series with the resonant capacitance Cr0 and is likewise shown in FIG. 2. It is mentioned here that the capacitor arranged on the primary side for DC suppression $C_{DC}$ is not part of the resonant circuit. The resonant circuit can be dimensioned e.g. by means of appropriate simulations or experimentally.

Figure 5:
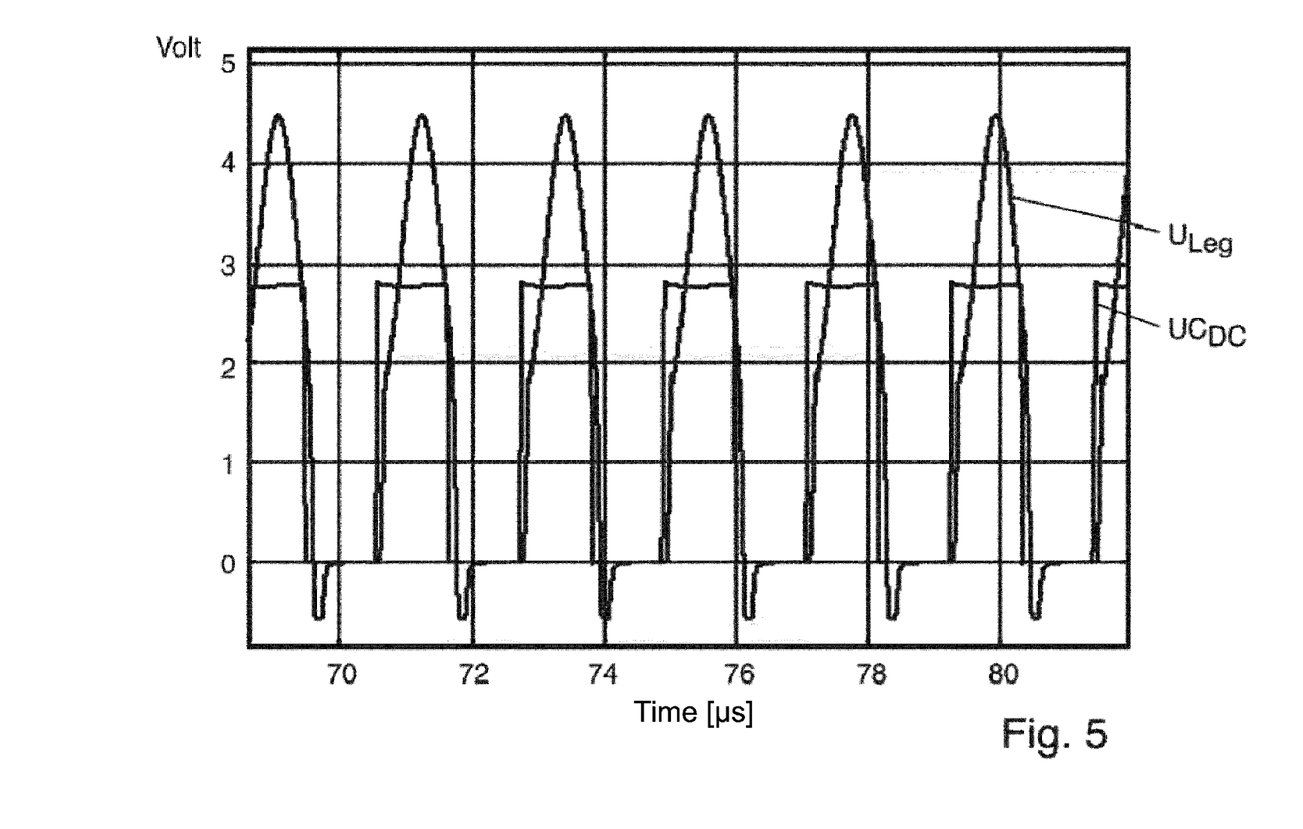
FIG. 5 shows the typical voltage curve or voltage forms of the transformer input voltage and output voltage.

FIG. 5 shows, by way of example, the result of such a circuit simulation. It is clear from FIG. 5 how, because of the resonant circuit Lr/Cr0, the square-wave voltage excitation at the transformer input $UC_{DC}$ leads to a sinusoidal output voltage $U_{Leg}$ on the secondary side of the transformer.

The resonant frequency of Lr0/Cr0<<Lr/Cr0 influences the commutation behavior; typically, Lr0 is parasitic and can or should be minimized. For the design of the circuit, a ratio of (Lr0/Cr0)/(Lr/Cr0)<10 has been found to be particularly advantageous.

Depending on the design of the synchronous rectifier, the resonant capacitance $C_{r0}$ can be arranged upstream or downstream of the synchronous rectifier, i.e. on the AC side or the DC side of the synchronous rectifier. In the embodiment shown in FIG. 2, the resonant capacitance $C_{r0}$ is arranged on the DC side of the synchronous rectifier. The DC-side arrangement has lower commutation losses, as will be described below. Another advantage of this embodiment is the simpler implementation of the transformer.

Figure 3:
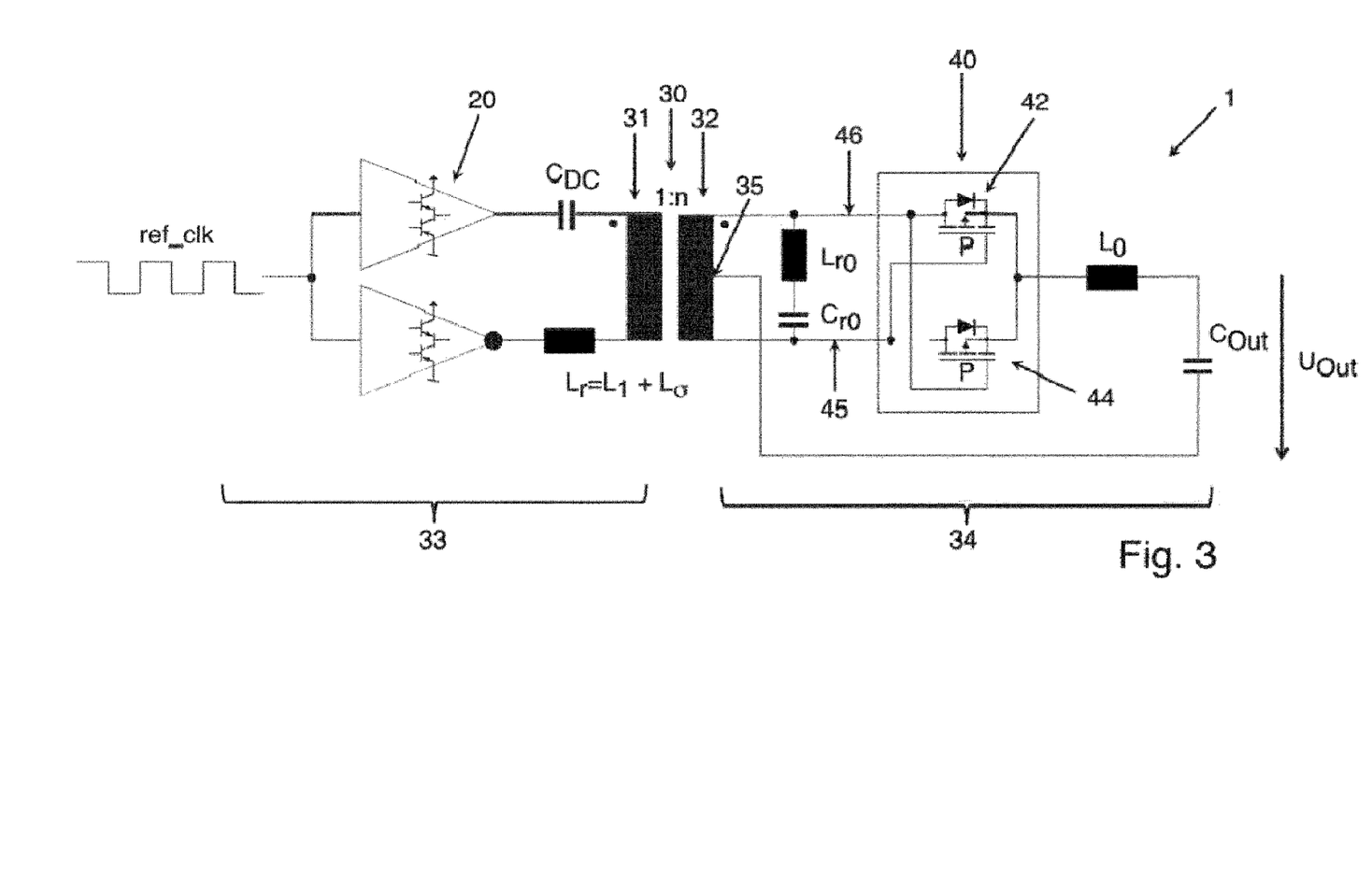
FIG. 3 shows a second embodiment of a DC/DC converter circuit according to the present disclosure.

FIG. 3 shows a second embodiment of a DC/DC converter circuit according to the invention. The DC/DC converter circuit is largely the same as the DC/DC converter circuit shown in FIG. 2. A difference, however, is that the synchronous rectifier is not designed as a four-way rectifier, but rather as a double-way rectifier with a center tap on the secondary coil of the transformer for voltage supply.

Furthermore, the two DC/DC converter circuits differ in the arrangement of the resonant capacitance $C_{r0}$ with the associated parasitic inductance Lr0. It is arranged, according to the second embodiment according to the invention, between the transformer output side and a synchronous rectifier input side, i.e. on the AC side of the synchronous rectifier. The two gates of the MOSFETs are in turn connected, via crossed control lines, to the secondary coil of the transformer for actuation.

Such a crossed actuation of the gates of the MOSFETs is suitable, according to the first and also the second embodiment, especially when the DC/DC converter circuit is designed such that an output voltage of the transformer is less than approximately 20 V. This can be realized e.g. by means of an appropriate turns ratio of the transformer.

Figure 6:
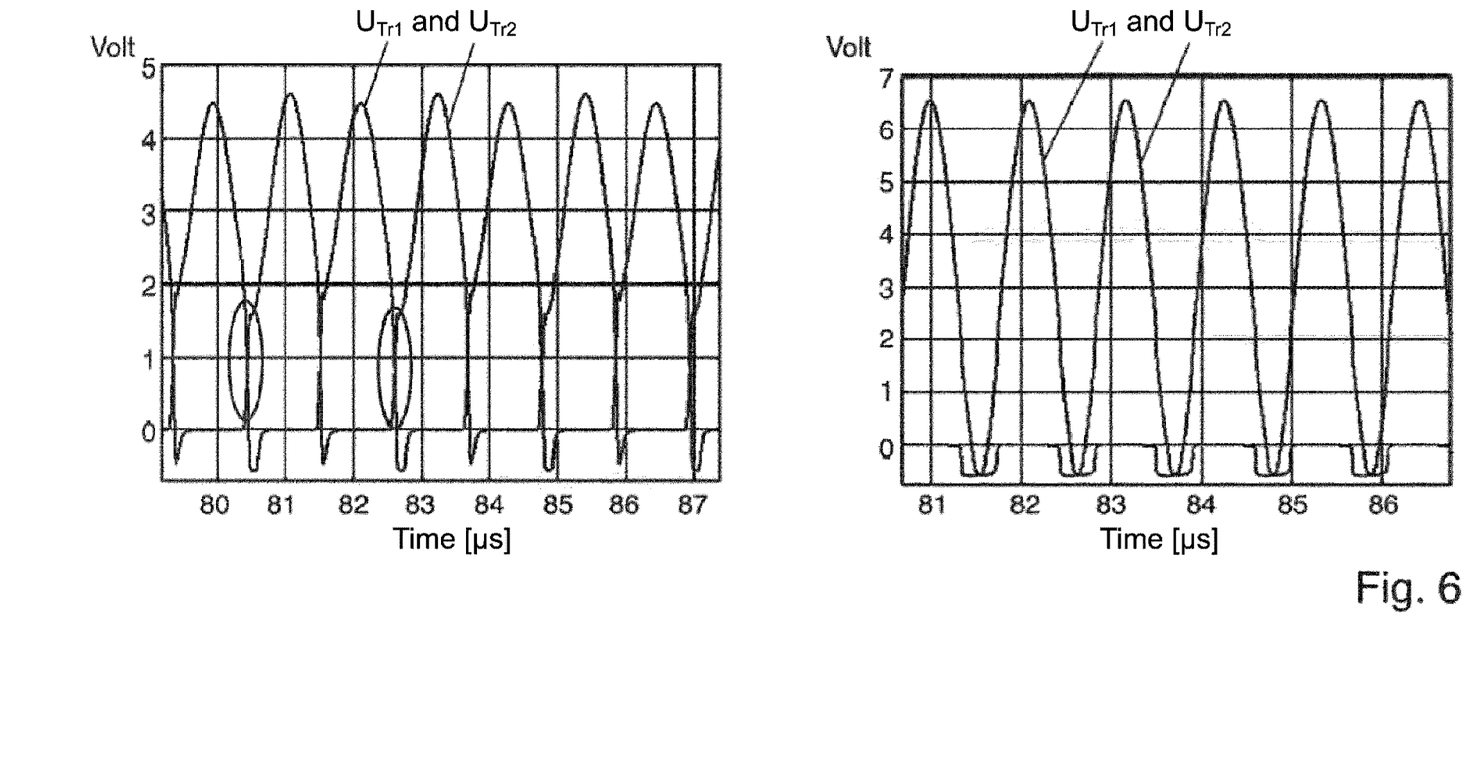
FIG. 6 shows a circuit simulation for illustrating the difference between the AC-side arrangement and the DC-side arrangement of the resonant capacitance $C_{r0}$.

As mentioned above, the arrangement of the resonance capacitance $C_{r0}$ with the associated parasitic inductance Lr0 (on the AC side or DC side) and the switching thresholds of the MOSFETs of the synchronous rectifier influence the commutation. FIG. 6 shows a circuit simulation for illustrating the difference between the AC-side arrangement and the DC-side arrangement of the resonant capacitance $C_{r0}$ (with the associated parasitic inductance Lr0), once downstream of the synchronous rectifier, i.e. on the DC side (left graph) and once upstream of the synchronous rectifier, i.e. on the AC side (right graph). The plotted voltages $U_{Tr1}$ and $UT_{r2}$ are the voltages on the secondary side of the transistor, at the coil start $U_{Tr1}$ and at the coil end $UT_{r2}$. With the DC-side arrangement of the resonant capacitance $C_{r0}$ with the associated parasitic inductance Lr0 according to the first embodiment, a current in the transformer that is impressed by the resonant circuit causes a non-sinusoidal rapid rise in the transformer output voltage during commutation. This leads to a faster switching on and off of the MOSFETs at the zero crossing of the transformer secondary voltage. This effect is shown in FIG. 6 on the left graph and is identified by two circles. This effect can only be used in the full-bridge synchronous rectifier variant according to the first embodiment, since, in the half-bridge synchronous rectifier variant according to the second embodiment, there is switching between two coils rather than polarity reversal of one coil. Furthermore, it is clear from FIG. 6 that the commutation process takes place at the zero crossing of the voltage. Thus, there is approximately zero-voltage switching.

The DC/DC converter circuit according to the invention offers the following advantages over the DC/DC converter circuit known from the prior art and shown in FIG. 1:
  A switching frequency into the MHz range is possible.
  Smaller fluctuations of the output voltage between idling and full load.
  Thanks to the synchronous rectification, significantly better efficiency despite an increased switching frequency.

The two embodiments of a DC/DC converter circuit according to the invention can be integrated into a robust, galvanically isolated bidirectional communication system, wherein the switching frequency serves simultaneously as a reference signal for modulation and demodulation (+−90° phase modulation).

Figure 7:
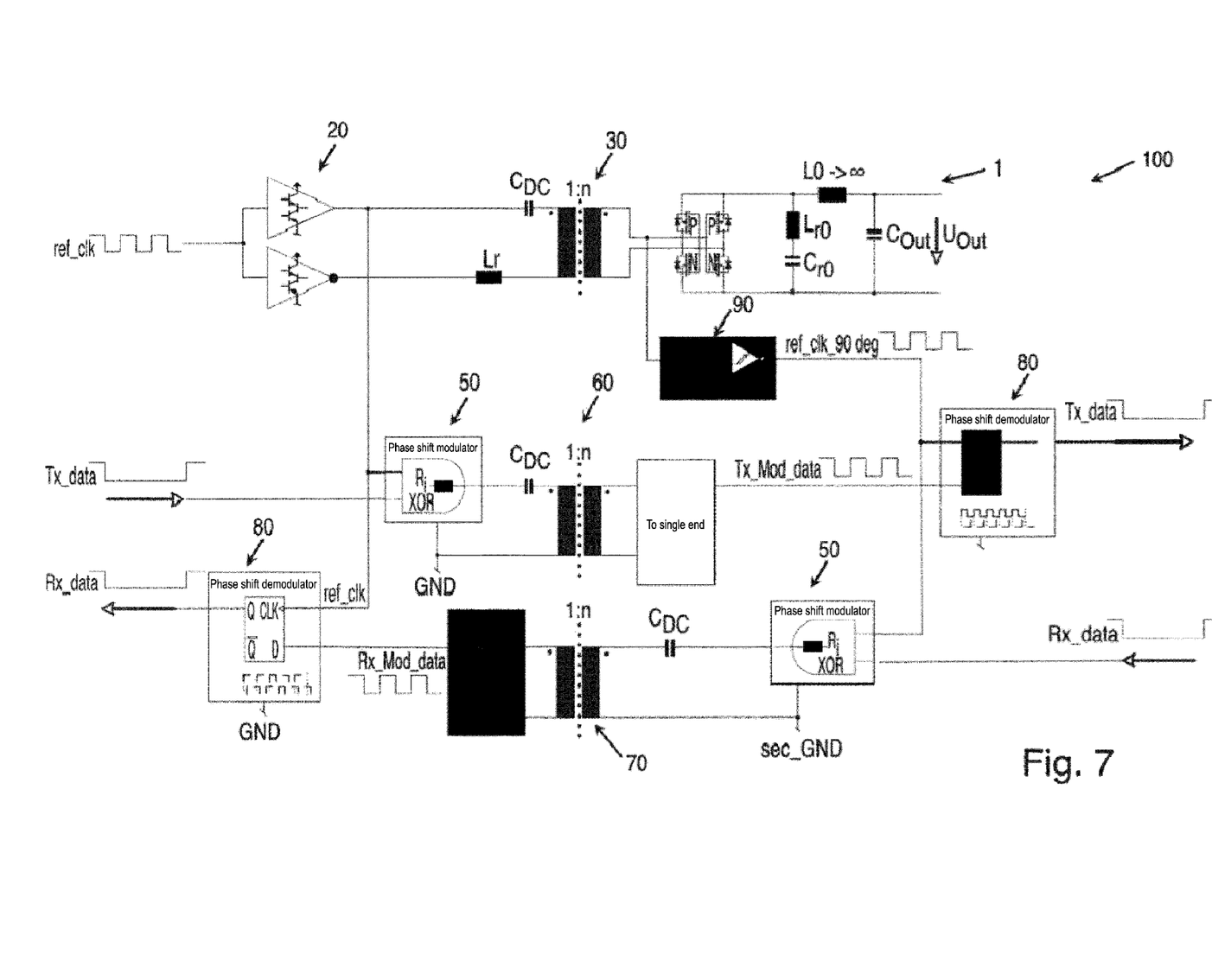
FIG. 7 shows a communication system according to the present disclosure for bidirectional galvanically isolated communication.

FIG. 7 shows such a galvanically isolated bidirectional communication system. The communication system comprises two communication channels, via which the data can be sent and received, and a DC/DC converter circuit.

The DC/DC converter circuit 1 can be designed according to either the first or the second embodiment according to the invention. By means of the DC/DC converter circuit 1, the output voltage $U_{Out}$ is provided on the secondary side.

The two communication channels, of which one is designed as a transmitting transfer channel Tx_data and one is designed as a receiving transfer channel Rx_data, are each designed such that they have galvanic isolation. According to the embodiment illustrated in FIG. 7, this is implemented by means of a transformer in each case. The invention is not limited to a transformer as galvanic isolation. The galvanic isolation can also be implemented optically or capacitively.

Furthermore, the two data transfer channels each have a modulator unit and a demodulator unit, which are isolated from one another by the galvanic isolation. On the primary side, a reference clock required for the data communication is provided by the DC/DC converter circuit: For this purpose, the communication system is designed such that the reference clock is tapped on the primary side downstream of the push-pull driver and is fed to the modulator unit of the transmitting transfer channel and to the demodulator unit of the receiving transfer channel. On the secondary side, the reference clock is implemented by a tap at the output of the transformer 30 and fed to the demodulator unit of the transmitting transfer channel and to the modulator unit of the receiving transfer channel. On the secondary side, a phase shift unit 90 for shifting the phase of the reference clock by 90° can preferably also be provided, the phase shift unit 90 being arranged between the tap on the secondary side of the transformer and the demodulator unit/the modulator unit, so that, on the primary side, modulation is carried out using the reference clock and, on the secondary side, demodulation is carried out using a reference clock phase-shifted by 90°. Alternatively, the phase shift unit 90 for shifting the phase can also be arranged on the primary side, so that, on the primary side, modulation is carried out using the reference clock phase-shifted by 90° and, on the secondary side, demodulation is carried out using the reference clock.

It is clear from FIG. 7 that, if the reference clock (reference for modulation/demodulation) is too small, the achievable data rate will be low. For robust signal transfer, it is therefore advantageous if at least eight times the frequency of the data rate is used as a frequency for the reference clock ref_clk.

Furthermore, the low complexity of such a bidirectional communication system 100 is clear from FIG. 7, since, in comparison with the communication system known from the prior art, one transfer channel less is required or the complex reference clock synchronization from the data signal for demodulation can be dispensed with. This is due especially to the DC/DC converter circuit designed according to the invention, which is used both for the galvanically isolated transfer of the output voltage for power supply and for the galvanically isolated provision of the reference clock on the secondary side.

Figure 8:
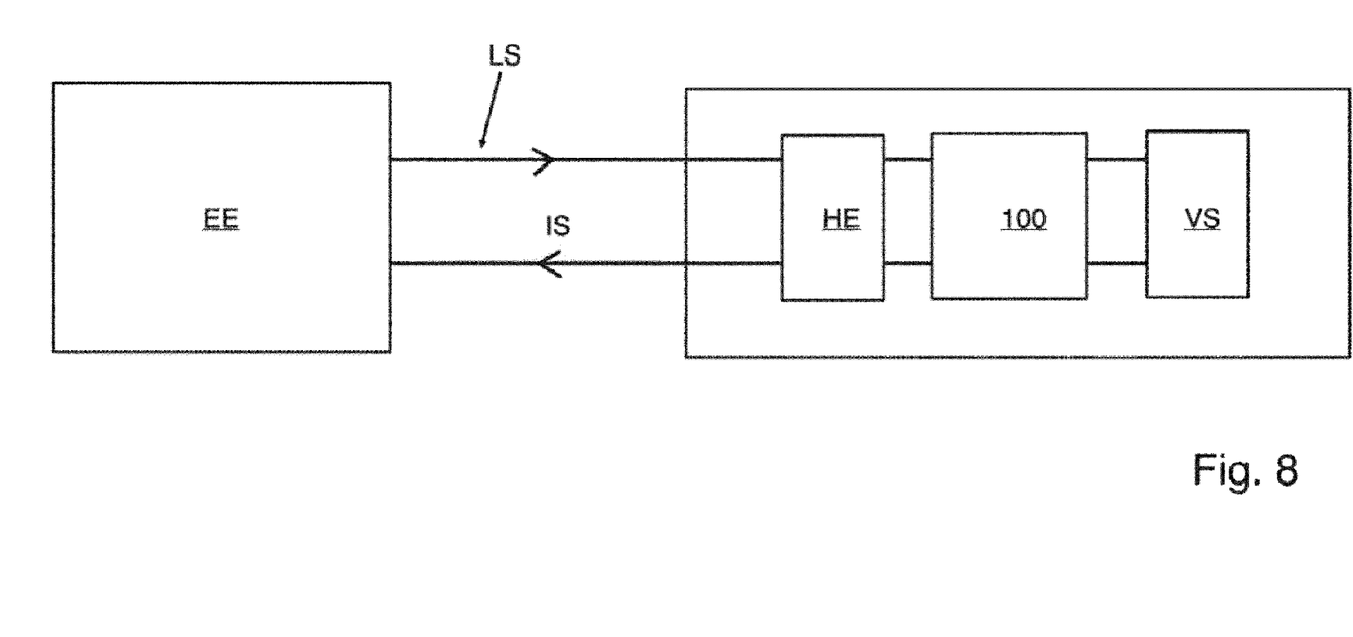
FIG. 8 shows a block diagram of an automation field device designed, by means of a communication system according to the present disclosure, for use in an explosive atmosphere, especially in an Ex-ia and/or Ex-d area.

Such a communication system can be used especially in the automation field devices described at the beginning. For this purpose, FIG. 8 shows in more detail a block diagram of such an automation field device F1 and of a receiving unit EE, for example a programmable logic controller (PLC). The communication between the receiving unit and the field device is effected via a 2-wire current loop LS. Via this, a measured value which is recorded by the field device F1 can be transferred to the receiving unit EE as a 4-20-mA current signal IS.

The field device F1 consists essentially of main electronics HE, a communication system 1, and a load circuit VS, for example sensor electronics of a sensor module for measuring a physical process variable. The communication system 1 is designed as described above and ensures the galvanic isolation between the primary-side circuit and the load circuit on the secondary side. Furthermore, the communication system 1 ensures that the supply voltage for the load circuit VS and the reference clock are provided, so that communication between the main electronics HE and the load circuit VS can take place by means of the communication system. Especially measurement data which represent the measured physical variable are transferred, with galvanic isolation, from the sensor electronics to the main electronics, and primarily parameters are transferred, with galvanic isolation, from the main electronics to the sensor electronics VS, via the communication system. By means of the galvanic isolation realized by means of the communication system, the field device can be used in an explosive atmosphere, especially an Ex-ia and/or Ex-d area.

The invention claimed is:

1. A method for operating a communication system for bidirectional galvanically isolated communication, the method comprising:
   providing the communication system, including:
      a DC/DC converter circuit, including:
         a push-pull driver to which a reference clock with a fixed frequency can be applied on an input side;
         a transformer having a primary coil and a secondary coil, wherein the push-pull driver is connected, on an output side, to the primary coil;
         a synchronous rectifier connected, on an AC side, to the secondary coil;
         a resonant circuit including a capacitance and one inductance, the resonant circuit being designed such that a part of the resonant circuit is on a primary side of the transformer and another part of the resonant circuit is on a secondary side of the transformer;
         a decoupling inductance connected on a secondary side of the transformer and downstream of the synchronous rectifier and which is not part of the resonant circuit; and
         an output capacitance connected in series with the decoupling inductance and via which an output voltage is provided;
      a transmitting transfer channel having a first modulator unit connected for data transfer to a first demodulator unit via a second galvanic isolation; and
      a receiving transfer channel having a second demodulator unit connected to a second modulator unit via a third galvanic isolation,
      wherein, for the modulation units and demodulation units, the DC/DC converter circuit also provides, on the primary side and the secondary side, the reference clock required for modulation and demodulation;
   applying to the push-pull driver on the input side the reference clock having the fixed frequency that is not changed during operation.

2. The method according to claim 1, wherein the frequency is greater than 100 kHz.

3. A communication system for bidirectional galvanically isolated communication, comprising:
   a DC/DC converter circuit, including:
      a push-pull driver to which a reference clock with a fixed frequency can be applied on an input side;
      a transformer having a primary coil and a secondary coil, wherein the push-pull driver is connected, on an output side, to the primary coil;
      a synchronous rectifier connected, on an AC side, to the secondary coil;
      a resonant circuit including a capacitance and one inductance, the resonant circuit being designed such that a part of the resonant circuit is on a primary side of the transformer and another part of the resonant circuit is on a secondary side of the transformer;
      a decoupling inductance connected on a secondary side of the transformer and downstream of the synchronous rectifier and which is not part of the resonant circuit; and
      an output capacitance connected in series with the decoupling inductance and via which an output voltage is provided,
      wherein the DC/DC converter circuit has a first galvanic isolation by virtue of the transformer and provides the output voltage for power supply on the secondary side of the transformer;
   a transmitting transfer channel having a first modulator unit connected for data transfer to a first demodulator unit via a second galvanic isolation; and
   a receiving transfer channel having a second demodulator unit connected to a second modulator unit via a third galvanic isolation,
   wherein, for the modulation units and demodulation units, the DC/DC converter circuit also provides, on the primary side and the secondary side, the reference clock required for modulation and demodulation.

4. The communication system according to claim 3, wherein the part of the resonant circuit on the secondary side of the transformer is connected to the synchronous rectifier on a DC side.

5. The communication system according to claim 4, wherein the synchronous rectifier includes four controlled field-effect transistors, wherein the field-effect transistors are directly connected to the secondary coil of the transformer via control lines so that a transformer output voltage actuates the field-effect transistors.

6. The communication system according to claim 5, wherein the synchronous rectifier is formed, in a positive half, from P-channel MOSFETs and, in a negative half, from N-channel MOSFETs.

7. The communication system according to claim 5, wherein the four field-effect transistors are connected to the secondary coil of the transformer such that a drain terminal of each field-effect transistor is connected to a coil start and a gate terminal of each field-effect transistor is connected to a coil end of the secondary coil or that a drain terminal of each field-effect transistor is connected to a coil end and a gate terminal of each field-effect transistor is connected to a coil start of the secondary coil.

8. The communication system according to claim 3, wherein the part of the resonant circuit on the secondary side of the transformer is connected to the synchronous rectifier on the AC side.

9. The communication system according to claim 8, wherein the synchronous rectifier includes two controlled field-effect transistors and the two field-effect transistors are directly connected to the secondary coil of the transformer via control lines so that a transformer output voltage actuates the field-effect transistors.

10. The communication system according to claim 9, wherein the output voltage is tapped between the decoupling inductance and a center tap of the secondary coil of the transformer.

11. The communication system according to claim 3, wherein a turns ratio of the transformer of the DC/DC converter circuit is selected such that the secondary-side transformer output voltage is less than 20 V.

12. The communication system according to claim 3, wherein an input capacitance for DC suppression is present on the primary side of the transformer, wherein the DC/DC converter circuit is designed such that the input capacitance is not part of the resonant circuit.

13. The communication system according to claim 3, wherein the reference clock is implemented on the primary side by a tap at the output of the push-pull driver of the DC/DC converter circuit, and the reference clock is implemented on the secondary side by a tap at the output of the transformer of the DC/DC converter circuit.

14. The communication system according to claim 13, wherein a phase shift unit for shifting the phase of the reference clock by 90° is inserted on the secondary side.

15. An automation field device for use in an explosive atmosphere, including in an Ex-ia and/or Ex-d area, comprising:
   a communication system for bidirectional galvanically isolated communication, including:
      a DC/DC converter circuit, including:
         a push-pull driver to which a reference clock with a fixed frequency can be applied on an input side;
         a transformer having a primary coil and a secondary coil, wherein the push-pull driver is connected, on an output side, to the primary coil;
         a synchronous rectifier connected, on an AC side, to the secondary coil;
         a resonant circuit including a capacitance and one inductance, the resonant circuit being designed such that a part of the resonant circuit is on a primary side of the transformer and another part of the resonant circuit is on a secondary side of the transformer;
         a decoupling inductance connected on a secondary side of the transformer and downstream of the synchronous rectifier and which is not part of the resonant circuit; and
         an output capacitance connected in series with the decoupling inductance and via which an output voltage is provided,
         wherein the DC/DC converter circuit has a first galvanic isolation by virtue of the transformer and provides the output voltage for power supply on the secondary side of the transformer;
      a transmitting transfer channel having a first modulator unit connected for data transfer to a first demodulator unit via a second galvanic isolation; and
      a receiving transfer channel having a second demodulator unit connected to a second modulator unit via a third galvanic isolation,
      wherein, for the modulation units and demodulation units, the DC/DC converter circuit also provides, on the primary side and the secondary side, the reference clock required for modulation and demodulation; and
   main electronics and sensor electronics,
   wherein the sensor electronics are galvanically isolated from the main electronics, and
   wherein the main electronics are connected, for data transfer, to the sensor electronics via the communication system.

* * * * *